July 15, 1958 S. G. JOHNSON 2,842,861
COMPARATOR CONTRACTIBLE PLUG GAGE
Filed Sept. 27, 1954
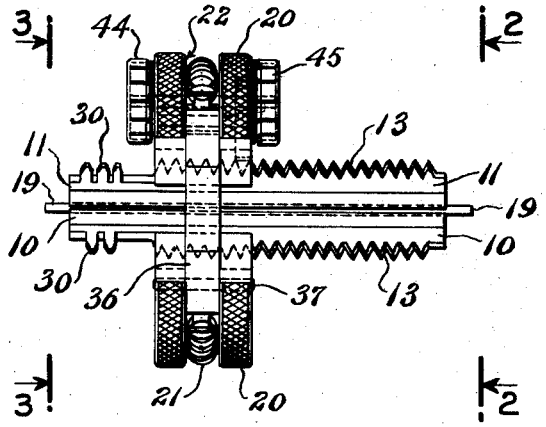
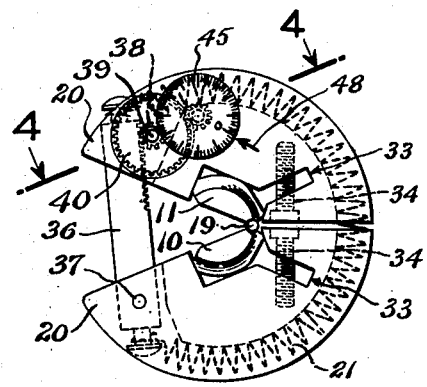
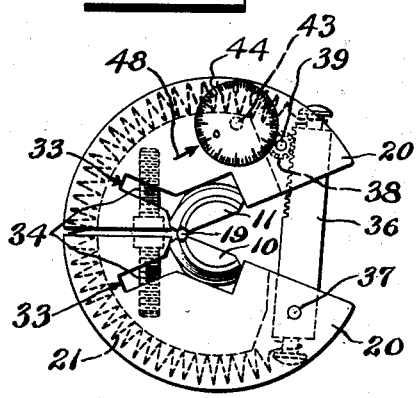
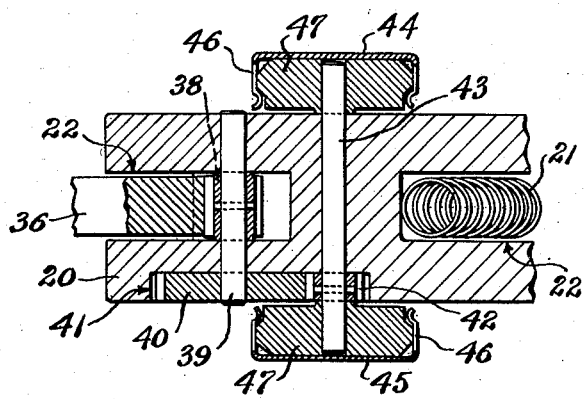
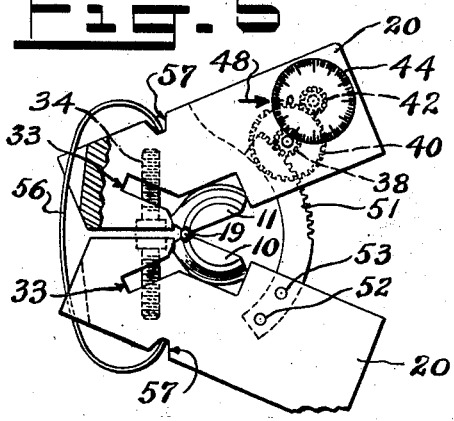
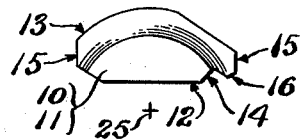
INVENTOR.
STANLEY G. JOHNSON
BY
ATTORNEYS United States Patent Office 2,842,861
Patented July 15, 1958

2,842,861
COMPARATOR CONTRACTIBLE PLUG GAGE

Stanley G. Johnson, West Hartford, Conn., assignor to The Johnson Gage Development Company, Bloomfield, Conn., a corporation of Connecticut Application September 27, 1954, Serial No. 458,631

9 Claims. (Cl. 33—199)

The invention relates to a comparator internal gage of the contractible and expansible type so that the gage may be axially inserted and removed from a hole to be gaged and a reading made as to any deviation in the hole. It is suitable for gaging internal plain cylindrical surfaces, grooves and screw threads. The gage includes two members or segments each having a gaging surface. The cross section of the segment is less than a semicircle although it is desirable to have it as near to a semicircle as possible yet allowing sufficient contraction for insertion and removal. One or both segments are mounted for pivotal movement on a longitudinal axis which lies within the boundaries of the gaging surfaces and adjacent the periphery thereof. Either both gaging means pivot for contraction and expansion or one pivots with respect to the other. The gage in its preferred form is inexpensive to manufacture yet is effective in gaging internal surfaces or holes.

It is an object of the invention to construct a new and novel internal gage which is pivotally contractible and expansible for insertion within a hole to be gaged, is pivotal upon a pivot whose axis is within the boundaries of the gaging surfaces and carries motion magnifying means for gaging or indicating the internal dimension.

Another object of the invention is to construct an internal gage of two gaging members one of which pivots with respect to the other or both pivot, the pivot being located interiorly or within boundaries formed by the gaging surfaces or their extension and carried by the gaging members and extending longitudinally thereof and adjacent to the gaging surface or surfaces with a simple and effective indicating means carried thereby.

Other objects of the invention will be more apparent from the following description when taken in connection with the accompanying drawings illustrating a preferred embodiment thereof in which:

Figure 1 is a side elevation of the gage in open position;

Figure 2 is an end view of the gage looking in the direction of 2—2 of Figure 1 with the gage in open position;

Figure 3 is an end view of the gage from the other end as viewed from lines 3—3 of Figure 1;

Figure 4 is an enlarged section taken on line 4—4 of Figure 2 showing a gear train and indicators;

Figure 5 is an end view of a contractible plug gage having an arcuate rack; and

Figure 6 is an enlarged end view of one of the gage members.

The gage includes a pair of cooperating gaging members 10 and 11, the outer surface of which is arcuate and forms the gaging surface. The gaging surface may conform to a groove to be gaged, may be plain surfaced, either cylindrical or taper, or may have screw threads 13, as particularly shown, and either cylindrical or taper threaded. The center 25, Figure 6, of the arc of the gaging surface 13 is the axis thereof. The gaging members are less than semi-cylindrical or less than a semicircle in cross section although they are of such size as to give a maximum of gaging surface yet permit sufficient contraction for axial insertion and removal. The gage structure illustrated is like one form shown in applicant's earlier application Ser. No. 309,820, now Patent 2,706,859, dated April 26, 1955, all of which forms are applicable herein and have chordal surfaces 12.

Pivot means pivotally supports or mounts the gaging members which means is within the boundaries of the gaging surfaces. The pivot means shown in the figures includes a groove 14 extending longitudinally in the chordal surface 12 of at least one gaging member although preferably a groove is provided in each gaging member. The grooves are parallel with the axis of the gaging surface. The groove particularly illustrated is a V-groove although it may be any desirable shape. The groove preferably is as close as possible to the gaging surface and for a screw thread its most desired location is with its edge closely adjacent to the minimum or root circle of the screw thread. Each edge 15 of each gaging surface having a screw threaded gaging surface is cut away to the roots of the screw thread in parallel planes for added clearance in removing the gage from a test threaded hole and they may serve as gripping or clamping surfaces.

A desirable way to make the gaging members for a screw threaded plug gage is to accurately form a screw thread on a piece of solid round stock and mill opposite parallel sides to the root diameter of the thread to form the flat parallel surfaces 15. This screw threaded piece is then cut in half such as by milling on a plane at right angles to the parallel surfaces in which the central area is milled out having a width approximately three times the radial depth of the thread measured from the outer diameter to the root diameter. A greater width reduces the extent of the gaging surface and a lesser width reduces the amount of maximum contraction of the gaging members and reduces the clearance of the gage in contracted position for ease in removal from the threaded hole of a test part. For a plain surfaced gage there is no need to provide the surfaces 15 or to have the center area which is milled away, to be so wide. The groove 14 is milled or otherwise formed in the chordal surface.

The pivot means for the gaging members includes the grooves 14 forming bearings and a pivot such as a pin which may be desirably about 1/10 the diameter of the gage. The center of the pivot is the axis thereof. The grooves 14 are dimensioned to support the pivot or pin 19 so that the gaging members may pivot thereon. It is clear that there is a considerable range of diameters of pins which may be used for this pivot; however, greater pivoting movement is secured when the pin is small relatively to the diameter of the gage members. The pivot pin is a simple straight pin or wire. A part of the back edge 16 may also be removed to provide pivoting clearance at this back edge; however, it should not be high enough to remove the point of contact of this side of the groove with the pivot pin. The grooves are adjacent to the gaging surface or spaced from the center of the chordal surface of the gaging members. With the grooves in the gaging members the latter provide their own bearing for the pivot means and the bearing has a length coextensive with the gaging members. Each gaging member supports and gives rigidity to the other.

Each gage member is secured to a mounting means, handle or lever 20 in any suitable manner so that the gaging members 10 and 11 project therefrom at least from one side thereof. The mounting means may be of any suitable shape. The grooves 14 are preferably located so that the pivot or pivot pin 19 is tangent to the minimum gaging circle which for a screw thread is the root circle. Means are provided to press the gaging members onto the pivot and to hold the gage in assembled relation, the means particularly illustrated being a spring means shown as a coil spring 21, preferably resting in a central groove 22 having a circumferential portion, and one end thereof secured to one mounting means and the other end secured to the other mounting means or secured to equivalent structure as will be described hereinafter. In Figure 5, a C-spring 56 is used. The mounting means 20 and the spring 21 or 56 constitute means for opening and closing the gaging members. The spring means also has the additional function in a construction using grooves 14 or half bearings of holding the gaging members together.

The gage is illustrated as a hand gage, that is, it may be moved to the work or may be used by holding it in the hand. The gage is used by pressing the two mounting means or handles together which close the gaging members with the chordal surfaces in contact or substantial contact whereupon the internal surface, groove or thread to be gaged is slipped over the end of the gaging members or the gage is inserted into the test hole. Upon releasing of the mounting means, the spring 21 opens the gaging members until they contact the internal surface to be gaged. An indicator to be described thereupon indicates whether or not the internal test surface is within the allowable tolerances and is acceptable. The gage is then closed and removed from the test hole.

It will be observed that it is the spring pressure of the spring 21 which holds the two gaging members 10 and 11 pivotally together on the pivot 19. This bearing is shown as a free pin in that it can slide axially in the grooves 14. The pivot may be two or more balls (not shown). The gaging members have free axial movement with respect to each other sliding longitudinally on the pivot pin. The gage members, therefore, automatically adjust themselves laterally with respect to a screw thread when this is the type of internal surface which is to be gaged. It is clear that the pivot if desired may be secured to or be a part of one gaging member in which case the bearing or groove 14 carried by the other member constitutes the cooperating pivotal part of the pivot means.

The gaging members may extend outwardly from both sides of the mounting means 20 in which case the gage may serve to give overall acceptability of an internal test thread and the pitch diameter thereof. On one side the thread or gaging surface 13 may be a full thread to provide an overall assemble-ability test. On the other end of the gaging members, the gaging surface 30 may have a short length of truncated thread of the same pitch diameter for engaging at the pitch diameter of the test thread and provide a pitch diameter test.

The gaging members 10 and 11 may be secured to the mounting means 20 in any suitable fashion. The securing means shown includes a slit 33 in each arm to provide flexibility and a screw 34 then clamps the mounting means against the flat faces 15 of the gaging member.

Indicating means is built into the mounting means for indicating any variation of a test part with respect to a master hole or internal thread. This means includes a rack secured to one mounting means and a gear mechanism connected therewith and carried by the other mounting means to amplify the movement of the rack. An indicator dial indicates the deviation from a master internal hole or thread. A straight rack 36 is used in the construction of Figures 1 to 4 which is pivotally mounted on one of the mounting means 20 by a pin 37. The motion of the rack is amplified by a gear mechanism or train carried by the other mounting means including a pinion 38 rotatably mounted on a pin or shaft 39, the pinion being mounted within the groove 22. A gear 40 is secured to the shaft 39 which is preferably mounted within a recess 41 in the face of the mounting member. The gear 40 meshes with a pinion 42 secured to a shaft 43 rotatably mounted in the mounting member. An indicating dial for each of the pairs of gaging means is secured to the shaft. An indicator dial 44 on one side or face of the mounting means is for the gaging means 13 and an indicating dial 45 on the other side or face is for the pitch diameter gaging means 30. The rack in being spaced from the pivot 19 a distance greater than the diameter of the gaging surfaces or spaced from the pivot beyond the gaging members secures an amplification of the movement at the gaging members.

Preferably each dial is mounted upon the shaft so that it may be turned relatively thereto. This is accomplished by having resilient means or fingers 46 on each dial which frictionally grip the side of a collar 47 so that the dial may be turned thereon but will remain in adjusted position. This adjustment permits the dial to be located at any point desired and particularly at a zero point with respect to a pointer 48 carried by the mounting means.

The rack 36 is held in mesh with the pinion 38 by one end of the spring 21 being secured to the end of the rack. The other end of the rack adjacent the pivot pin 37 provides a convenient place or anchorage for the other end of the spring. The attachment to the ends of the rack is in operation and function the equivalent of being attached to the mounting means. The spring, therefore, serves three functions, namely, it retains the rack against the pinion, holds the mounting means together pressed upon the pivot 19, and it opens the gaging members.

Figure 5 illustrates essentially the same construction of gaging means as illustrated in Figures 1 through 4 excepting that a circular rack 51 is used which is secured to one of the mounting members so that it is movable therewith. This circular rack is mounted with its center corresponding with or on the axis of the pivot pin 19 for the gaging means. It may be pivotally secured to the mounting member for pivotal movement on a pin 52, in the same manner that the straight rack of Figure 2 is secured although it may be fixed thereto by a second pin 53. Since the mounting member 20 pivots on the pin 19, the rack will always properly mesh with the pinion 38. The motion amplifying gear mechanism or train is the same as that described in connection with Figures 1 through 4 and the indicator dial or dials are also the same so that this mechanism need not be again described.

Each rack provides an operating connection by which the relative movement of one mounting member to which it is attached is transmitted to the indicator which is carried by the other mounting member. The indicator may have amplifying means to increase the relative movement such as the gear train shown. This amplification is in addition to the amplification secured by virtue of the location of the rack or operating connection spaced from the pivot a distance greater than that of the gaging members.

A C-spring 56 is shown as retaining the gaging means assembled on the pivot pin 19 and pressing them to open position an illustrated. One end of the spring rests in a notch 57 and the other end rests in a similar notch 57 in the other mounting means, the two notches being located so that a line or plane therebetween is adjacent to but spaced from the pivot pin 19 and preferably on a side thereof to open the gaging members.

In setting the gage the three wire system with micrometer can be used. In other words expensive master rings are not necessary which is the present practice. In fact the type of comparator shown in the Johnson patent, 2,432,160, can be used to set the plug gage by first setting the comparator with a master plug which is standard equipment with this type of comparator and then set the expansible plug gage with this comparator. The gage may also be used to gage tapered surfaces either plain grooved or threaded in which the side face of arms 20 may serve as the axial stop for gaging position.

This invention provides an improvement in a comparator contractible plug gage. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A pivotally contractible comparator plug gage comprising a pair of mounting means, a pair of gaging members each secured to a mounting means and having an arcuate external gaging surface with the center of the arc forming an axis, each gaging member being less than a semicircle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to retain the mounting means together and to pivot the mounting means and the gaging members on the pivot means, the mounting means having a dimension substantially greater than the diameter of the arcuate gaging surface of the gage members, a rack attached to one mounting means at a point spaced from the pivot means a distance substantially greater than the distance of the gaging members from the pivot means and upon the same side of the pivot means as the gaging members, gear means carried by the other mounting means at a point spaced from the pivot means a distance substantially greater than the distance of the gaging members from the pivot means and upon the same side of the pivot means as the gaging members and meshing with the rack, and an indicator dial carried by the mounting means for the gear means and connected with the gear means.

2. A pivotally contractible comparator plug gage comprising a pair of mounting means, a pair of gaging members each secured to a mounting means and having an arcuate external gaging surface with the center of the arc forming an axis, each gaging member being less than a semicircle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to retain the mounting means together and to pivot the mounting means and the gaging members on the pivot means, the mounting means having a dimension substantially greater than the diameter of the arcuate gaging surface of the gage members, a straight rack pivotally attached to one mounting means at a point spaced from the pivot means a distance substantially greater than the distance of the gaging members from the pivot means and upon the same side of the pivot means as the gaging members, gear means carried by the other mounting means at a point spaced from the pivot means a distance substantially greater than the distance of the gaging members from the pivot means and upon the same side of the pivot means as the gaging members and meshing with the rack, and an indicator dial carried by the mounting means for the gear means and connected with the gear means.

3. A pivotally contractible comparator plug gage comprising a pair of mounting means, a pair of gaging members each secured to a mounting means and having an arcuate external gaging surface with the center of the arc forming an axis, each gaging member being less than a semicircle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to retain the mounting means together and to pivot the mounting means and the gaging members on the pivot means, the mounting means having a dimension substantially greater than the diameter of the arcuate gaging surface of the gage members, a circular rack attached to one mounting means at a point spaced from the pivot means a distance substantially greater than the distance of the gaging members from the pivot means and upon the same side of the pivot means as the gaging members with its center located on the axis of the pivot means, gear means carried by the other mounting means at a point spaced from the pivot means a distance substantially greater than the distance of the gaging members from the pivot means and upon the same side of the pivot means as the gaging members and meshing with the rack, and an indicator dial carried by the mounting means carrying the gear means and connected with the gear means.

4. A pivotally contractible comparator plug gage comprising a pair of mounting means, a pair of threaded gaging members each secured to a mounting means and having an arcuate external gaging surface with the center of the arc forming an axis, each gaging member being less than a semicircle in cross section, each gaging member extending from each side of the mounting means, one having a full thread and the other a truncated thread for pitch diameter gaging, pivot means carried by the gaging members to pivotally mount the gaging members and having its axis extending parallel to the axis of the gaging surface, the pivot means axis being within boundaries formed by the gaging surfaces and located adjacent to the gaging surfaces, spring means to retain the mounting means together and to pivot the mounting means and the gaging members on the pivot means, a rack attached to one mounting means, gear means carried by the other mounting means and meshing with the rack, and an indicator on each side of the mounting means and connected with the gear means.

5. A pivotally contractible comparator plug gage as in claim 4 in which the rack is straight and pivotally attached to its mounting means.

6. A pivotally contractible comparator plug gage as in claim 5 in which the rack is circular and attached to its mounting means with its axis located on the axis of the pivot means.

7. A pivotally contractible comparator plug gage comprising a pair of mounting means, a pair of gaging members each secured to a mounting means and having an arcuate external gaging surface with the center of the arc forming an axis, each gaging member being less than a semicircle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, a rack attached to one mounting means, gear means carried by the other mounting means and meshing with the rack, an indicator dial carried by the mounting means for the gear means and connected with the gear means, and spring means connected with the rack to press the latter against the gear means and to pivot the mounting means and the gaging members on the pivot means.

8. A pivotally contractible comparator plug gage comprising a pair of mounting means having a circumferential groove, a pair of gaging members each secured to a mounting means and having an arcuate external gaging surface with the center of the arc forming an axis, each gaging member being less than a semicircle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, a rack attached to one mounting means, gear means carried by the other mounting means and meshing with the rack, an indicator dial carried by the mounting means for the gear means and connected with the gear means, and a coil spring having at least one end attached to the rack at one mounting means and the other end connected with the other mounting means and located in the circumferential groove.

9. A pivotally contractible comparator plug gage comprising a pair of mounting means, a pair of gaging members each secured to a mounting means and having an arcuate external gaging surface with the center of the arc forming an axis, each gaging member being less than a semicircle in cross section, pivot means carried by the gaging members to pivotally mount the gaging members and having its axis extending parallel to the axis of the gaging surface, the pivot means axis being within boundaries formed by the gaging surfaces and located adjacent to the gaging surfaces, means to pivot the mounting means and the gaging members on the pivot means, the mounting means having a dimension substantially greater than the diameter of the arcuate gaging surface of the gage members, and means to indicate the relative position between the gaging members including an operating connection attached to one mounting means at a point spaced from the pivot means a distance substantially greater than the distance of the gaging members from the pivot means and upon the same side of the pivot means as the gaging members, an indicator carried by the other mounting means spaced from the pivot means a distance substantially greater than the distance of the gaging members from the pivot means and upon the same side of the pivot means as the gaging members, and the indicator being operatively connected with the operating conection to operate the indicator upon pivotal movement of the mounting means and the gaging members.

References Cited in the file of this patent

UNITED STATES PATENTS

| | | |
|---|---|---|
| 1,506,704 | Williamson | Aug. 26, 1924 |
| 1,849,959 | Schneider | Mar. 15, 1932 |
| 2,039,718 | Johanson | May 5, 1936 |
| 2,706,859 | Johnson | Apr. 26, 1955 |